United States Patent
Faget et al.

(10) Patent No.: US 10,202,032 B2
(45) Date of Patent: Feb. 12, 2019

(54) PROPULSION UNIT FOR A HYDRAULIC HYBRID VEHICLE, COMPRISING AN ELECTRIC MACHINE

(71) Applicant: TECHNOBOOST, Paris (FR)

(72) Inventors: Sébastien Faget, Herblay (FR); Pascal Gateau, Parmain (FR)

(73) Assignee: TECHNOBOOST, Paris (FR)

( * ) Notice: Subject to any disclaimer, the term of this patent is extended or adjusted under 35 U.S.C. 154(b) by 457 days.

(21) Appl. No.: 14/901,788

(22) PCT Filed: Jun. 10, 2014

(86) PCT No.: PCT/FR2014/051376
§ 371 (c)(1),
(2) Date: Dec. 29, 2015

(87) PCT Pub. No.: WO2015/001215
PCT Pub. Date: Jan. 8, 2015

(65) Prior Publication Data
US 2016/0311307 A1    Oct. 27, 2016

(30) Foreign Application Priority Data

Jul. 2, 2013 (FR) ..................................... 13 56416

(51) Int. Cl.
*B60K 6/48*      (2007.10)
*B60K 6/485*     (2007.10)
(Continued)

(52) U.S. Cl.
CPC ............. *B60K 6/485* (2013.01); *B60K 1/00* (2013.01); *B60K 6/00* (2013.01); *B60K 6/12* (2013.01);
(Continued)

(58) Field of Classification Search
CPC ..................... B60K 6/48; B60K 2006/4825
(Continued)

(56) References Cited

U.S. PATENT DOCUMENTS 6,048,288 A * 4/2000 Tsujii ............... B60H 1/3222
                                                      180/65.25
8,695,743 B2 * 4/2014 Kraxner ............... F04B 49/00
                                                      180/165
(Continued)

FOREIGN PATENT DOCUMENTS

DE    102011006087 A1    9/2012
EP         1085183 A2    3/2001
(Continued)

OTHER PUBLICATIONS

International Search Report from corresponding International Application No. PCT/FR2014/051376 dated Sep. 5, 2014.

*Primary Examiner* — Ha Dinh Ho
(74) *Attorney, Agent, or Firm* — Sandberg Phoenix & von Gontard, P.C.

(57) ABSTRACT

Propulsion unit for a hydraulic hybrid vehicle, comprising a transmission receiving power from a heat engine and from a second power source powered by hydraulic energy, to drive the wheels of the vehicle, characterized in that with the heat engine comprising no specific electric starter intended to drive same directly, one side of the casing (2) thereof, parallel to the axis, is fitted with an electric machine connected to a connecting shaft (12) which goes into the transmission.

9 Claims, 1 Drawing Sheet

(51) Int. Cl.
  *B60K 1/00*   (2006.01)
  *B60K 6/20*   (2007.10)
  *F02N 15/00*  (2006.01)
  *F02N 15/02*  (2006.01)
  *B60K 6/00*   (2006.01)
  *B60K 6/12*   (2006.01)
  *B60K 6/40*   (2007.10)
  *B60K 6/26*   (2007.10)
  *B62D 65/10*  (2006.01)

(52) U.S. Cl.
  CPC .................. *B60K 6/20* (2013.01); *B60K 6/26* (2013.01); *B60K 6/40* (2013.01); *B62D 65/10* (2013.01); *F02N 15/006* (2013.01); *F02N 15/02* (2013.01); *B60K 2006/268* (2013.01); *B60Y 2200/92* (2013.01); *Y02T 10/6208* (2013.01); *Y02T 10/6282* (2013.01); *Y10S 903/906* (2013.01)

(58) Field of Classification Search
  USPC ...................................... 74/665 B; 180/65.25
  See application file for complete search history.

(56) References Cited

U.S. PATENT DOCUMENTS

| | | | |
|---|---|---|---|
| 8,718,843 B2 * | 5/2014 | Kubota | B60L 11/123 701/22 |
| 9,085,222 B1 * | 7/2015 | McParland | B60L 11/1803 |
| 9,884,615 B2 * | 2/2018 | Pandit | B60W 20/11 |
| 2007/0095587 A1 | 5/2007 | DuCharme | |

FOREIGN PATENT DOCUMENTS

| | | |
|---|---|---|
| EP | 2230119 A2 | 9/2010 |
| FR | 2973302 A1 | 10/2012 |
| WO | 02/092373 A1 | 11/2002 |

* cited by examiner

PROPULSION UNIT FOR A HYDRAULIC HYBRID VEHICLE, COMPRISING AN ELECTRIC MACHINE

CROSS-REFERENCE TO RELATED APPLICATIONS

This application is the US National Stage under 35 U.S.C. § 371 et. seq. of International Application No. PCT/FR2014/051376 filed Jun. 10, 2014 which in turns claims priority to French App. No. 1356416 filed Jul. 2, 2013.

BACKGROUND

The present invention relates to a powertrain for a hybrid vehicle and a method of assembling this powertrain and a hybrid vehicle having such a powertrain.

A type of known hybrid vehicle, disclosed, in particular, in French Pat. No. 2973302, includes a transmission receiving power from a combustion engine and a hydraulic machine in order to drive the drive gears in different combinations. The transmission further includes a hydraulic pump that can recharge pressure accumulators for storing auxiliary energy in the form of hydraulic pressure, in order to then return the energy to the hydraulic machine.

Different operating modes are obtained comprising, in particular, a mode in which the vehicle is powered solely by the hydraulic machine consisting of the stopped combustion engine, without emission of polluting gas; a mode in which the vehicle is powered by the hydraulic machine and combustion engine; and a mode in which the vehicle is powered by the internal combustion engine only.

Furthermore, in a conventional manner, the combustion engine of the motor vehicles is constantly driving an alternator supplying an electric current, which feeds the on-board power supply network, and recharges the battery in this network. This constant supply of electrical current is required to ensure in particular the safety of the vehicle.

In order to provide a recharging current during shutdown of the engine with the alternator no longer rotating, which can be relatively long, in the case where the amount of stored auxiliary energy is important, the engine can be restarted to drive the generator and recharge the battery of the onboard network. However, these successive starts of the engine reduce the energy performance of the powertrain.

One can also use a technology in a known way, comprising high electrical capacitors, known as "supercapacitors," connected to the onboard network by a power converter in order to obtain a more significant reserve of electrical energy, capable of powering this supply network during longer shutdowns of the combustion engine.

Yet these capacitors and the converter constitute a significant volume and a relatively large mass as well as high costs. In addition, electrical cables must be provided with a section sufficient to pass the high power feeding the supercapacitors, which poses problems with connecting the electrical harness.

SUMMARY

The present invention is intended to avoid these disadvantages of the prior art.

For this purpose a powertrain for a hydraulic hybrid vehicle is proposed, comprising a transmission receiving power from an internal combustion engine, and a second motor powered by hydraulic energy for driving the vehicle wheels, characterized in that the internal combustion engine has no specific electric starter provided to drive it directly, receives on one side of the crankcase parallel to the axis an electric motor attached to a stub shaft which re-enters into the transmission.

An advantage of this powertrain and by using a transmission that can continuously drive the electric motor while the vehicle is in motion with the internal combustion engine stopped, in order to power the onboard network, is that it is possible to do without additional electrical energy storage facilities such as supercapacitors.

Moreover providing an electric motor which can be used to start the internal combustion engine frees up the position or space usually provided for the electric starter on the side of this engine, which allows the positioning of the electric motor to this site in order to achieve a compact powertrain, including volumes that differ little from a powertrain of a conventional vehicle.

The powertrain may also include one or more of the following features, which can be combined.

Advantageously, a speed reduction gear is arranged between the shaft of the electric motor and the connecting shaft.

In particular, the shaft of the electric motor and the connecting shaft may be offset laterally.

According to one embodiment, the shaft of the electric motor and the connecting shaft are connected together by sprockets.

According to another embodiment, the shaft of the electric motor and the connecting shaft are connected together by a belt.

Advantageously, the motor crankcase is featured on one side of a transverse wall receiving the rear side the electric motor, this wall being traversed by the connecting shaft.

Advantageously, the combustion engine comprises, on one side of its housing parallel to the axis, a placement intended for typically receiving an electric starter. The electric motor is arranged in place of this starter.

The invention also relates to a method of assembling a powertrain comprising any one of the preceding characteristics, first with the coupling of the electric motor with a reducing agent to form a subassembly, which is attached on the combustion engine, the transmission then being approached from this motor to attach it above.

The invention further relates to a hydraulic hybrid motor vehicle having a powertrain traction comprising any one of the preceding characteristics.

DESCRIPTION OF THE FIGURES

The invention will be better understood and other features and advantages will appear more clearly upon reading the following description given by way of example and without limitation, with reference to the accompanying drawings in which.

DESCRIPTION

Figure 1:
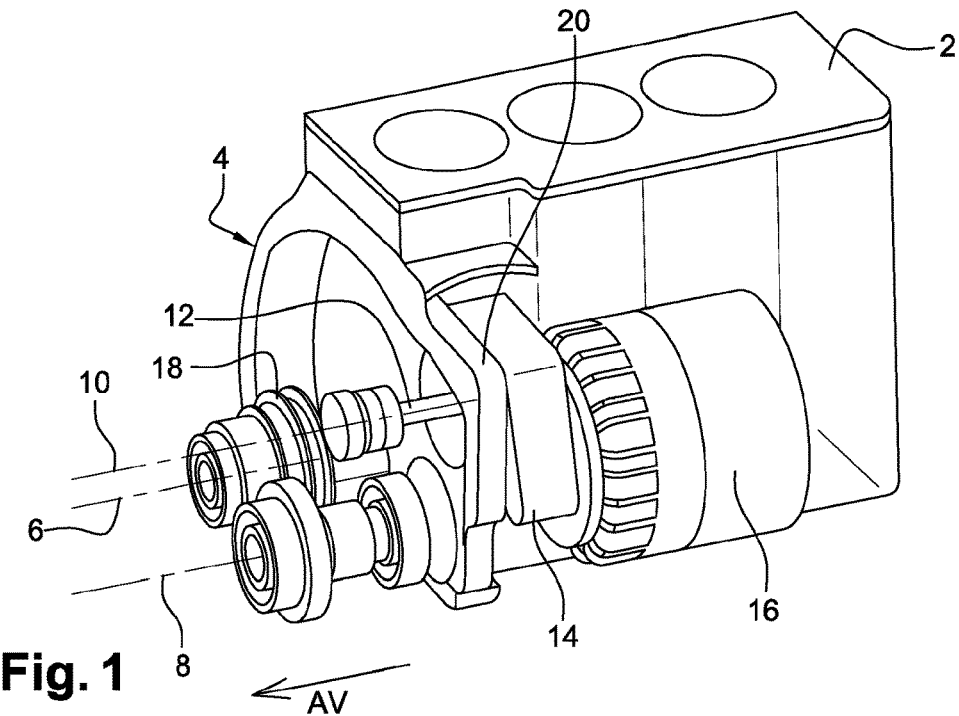
FIG. 1 shows a motor receiving on the side an electric motor driven by a speed reduction unit to a powertrain according to the invention.

FIG. 1 shows a motor crankcase 2 having three vertical cylinders, comprising a transverse surface 4 located on the side, called by convention the front side, indicated by an arrow denoted by "AV," intended to receive the support of a transmission driving the drive wheels of a hydraulic hybrid vehicle.

The engine and the transmission are arranged transversely in the vehicle, between the front wheels in order to drive them.

The transmission receives mechanical power from the crankshaft of the combustion engine, and a hydraulic machine (not shown), for driving the drive wheels by a combination of these powers according to the operation mode required. Depending on the mode of operation, the transmission may drive a hydraulic pump to recharge pressure accumulators, which then releases the pressure to the hydraulic machine.

The transmission includes different parallel shafts, including a shaft arranged along an axis 6 supporting two pinions 18 engaged by a synchronization sleeve sliding axially between them. The front pinion meshes with a pinion disposed along a first parallel axis 8, the rear pinion meshing with a pinion carried by a connecting shaft 12 arranged along a second parallel axis 10.

The engine crankcase 2 has a transverse wall 20 on the side of the engine facing the rear of the vehicle, which extends transverse to the front face receiving the transmission. The engine crankcase 2 is arranged to usually receive on this side an electric starter comprising an axis parallel to the crankshaft, with a forward nose comprising a pinion protruding forwardly of the transverse wall 20, which engages a ring mounted on the engine flywheel attached to the front end of the crankshaft.

An electric motor 16 installed in place of the starter comprises a shaft arranged parallel to the crankshaft, the front end of which enters a speed reduction unit 14 attached to the rear face of the transverse wall 20. The output of the reduction unit drives the rear end of the connecting shaft 12, this shaft extending through the transverse wall 20 to enter the transmission.

The speed reducer 14 comprises two cases arranged in a transverse plane, forming a sealed inner volume receiving the gears which connect the shaft of the electric motor 16 to the connecting shaft 12 of the transmission.

In this way the speed reducer 14 allows both to select the gear ratio between the shaft of the electric motor 14 and the connecting shaft 12, and to manage the lateral offset range between these two axes. In particular the speed of the electric motor 16 can be adjusted to obtain the best performance of this motor.

The electric motor 16 is driven by the differential connected to the drive gears of the vehicle, thereby generating an electric current to recharge the battery of the vehicle electrical system when the vehicle is running, even if the combustion engine is stopped.

This electric current that can be generated continuously, avoids in particular the installation of additional means of energy storage, such as supercapacitors having a converter, which are bulky and expensive. In addition, this avoids connecting an electric harness of a certain power to these storage means, which can be arranged in particular in the front of the vehicle.

Conversely, the electric motor 16 can deliver torque to the drive wheels by withdrawing electrical energy from the batteries, in order to add it to the torque delivered by the hydraulic machine. A complementary torque can thus be provided in particular for vehicle start-ups in forward or reverse gear.

The torque of the electric motor 16 can also be added to the one supplied by the combustion engine in order to obtain particularly high output, allowing high accelerations.

According to the arrangement of the transmission, the electric motor 16 can be used as starter for the combustion engine, in particular by delivering a high torque for cold start-ups.

For the assembly of the powertrain, it advantageously couples the electric motor 16 with its reducer 14 to form a subassembly, which is attached to the combustion engine. The transmission is then approximated axially from the assembly comprising the combustion engine and electric motor 16, to secure it above. The powertrain thus formed is then installed in the vehicle on the assembly lines of this vehicle.

Figure 2:
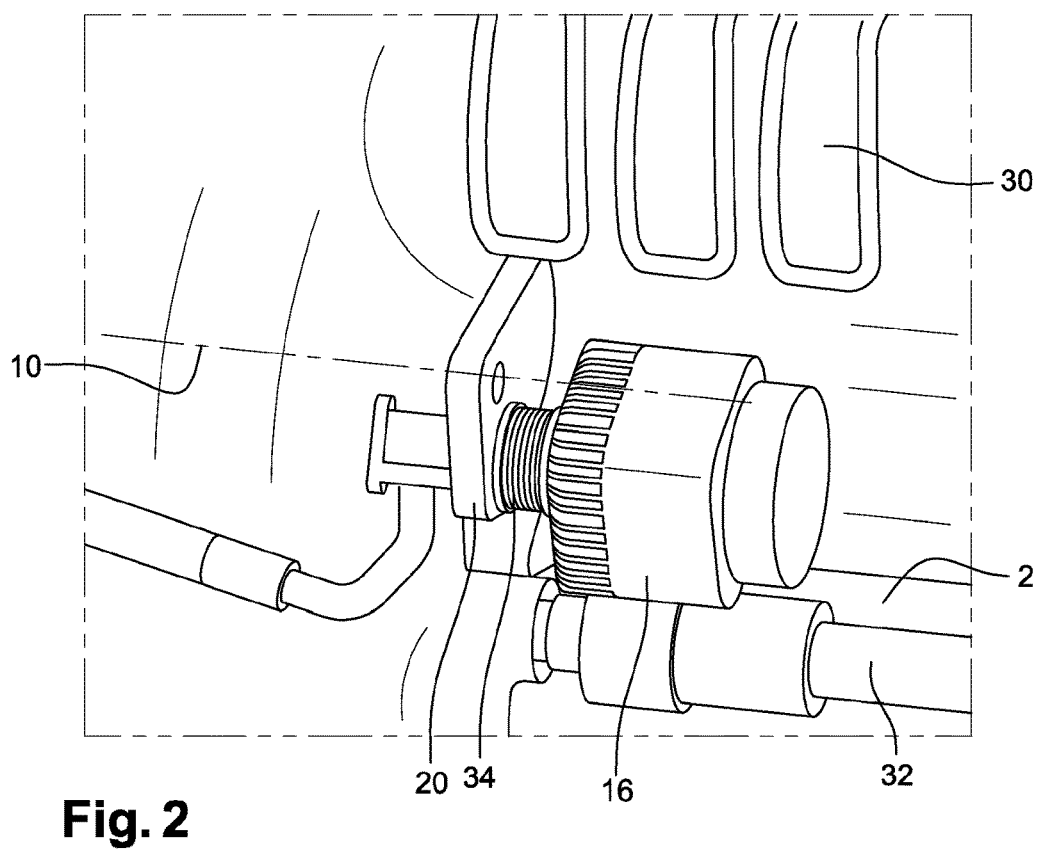
FIG. 2 alternatively presents a motor receiving on the side an electric motor driven by another type of speed reduction unit.

FIG. 2 shows the electric motor 16 located above a gear shaft 32, along the motor crankcase 2 for connecting the integrated differential output in the transmission located on the left side of the vehicle to the gear located on the other side. The electric motor 16 is also located below the intake manifold 30 arranged on the motor crankcase 2 for feeding the cylinder head.

The front end of the shaft of the electric motor 16 comprises a pulley 34 with several notches, receiving a belt driving a second pulley not shown, located at the rear end of the connecting shaft disposed along the axis 10.

This thus provides a speed reducer by the belt and the pulleys for adjusting the rotational speed of the electric motor 16, and for managing the lateral offset range between the axis of this motor and that of the connecting shaft 12.

The invention claimed is:

1. A powertrain for a hydraulic hybrid vehicle, the powertrain comprising a transmission receiving power from a combustion engine and a second motor driven by hydraulic energy for driving the wheels of the vehicle, wherein the internal combustion engine has no specific electric starter provided to drive said internal combustion engine directly, said powertrain including an electric motor positioned on one side of a crankcase of the combustion engine to be parallel to an axis of the combustion engine, said electric motor being linked to a connecting shaft which enters the transmission such that said electric motor is driven by said transmission.

2. The powertrain according to claim 1, wherein a speed reducer is arranged between a shaft of the electric motor and the connecting shaft.

3. The powertrain according to claim 1, wherein the shaft of the electric motor and the connecting shaft are laterally offset.

4. The powertrain according to claim 2, wherein the shaft of the electric motor and the connecting shaft are interconnected to one another by pinions.

5. The powertrain according to claim 2, wherein the shaft of the electric motor and the connecting shaft are interconnected to one another by a belt.

6. The powertrain according to claim 1, wherein the motor crankcase is arranged on one side of a transverse wall receiving a rear side of the electric motor, this transverse wall being traversed by the connecting shaft.

7. The powertrain according to claim 1, wherein the internal combustion engine has, on one side of said crankcase and parallel to the axis of the internal combustion engine, a position intended for receiving an electric starter, the electric motor being arranged at this position in place of the starter.

8. A method of assembling the powertrain of claim 1, wherein the method comprises firstly coupling the electric motor with a reducer to form a subassembly which is attached to the combustion engine, the transmission then being brought up to said electric motor to attach the transmission.

9. A hydraulic hybrid motor vehicle having the powertrain drive according to claim 1.

\* \* \* \* \*